(12) United States Patent
Jugl et al.

(10) Patent No.: US 9,204,456 B2
(45) Date of Patent: Dec. 1, 2015

(54) LOAD CONTROL FOR WIRELESS BASE STATION

(75) Inventors: Enrico Jugl, Nuremberg (DE); Jung A. Lee, Pittstown, NJ (US); Jens Mueckenheim, Nuremberg (DE)

(73) Assignee: Alcatel Lucent, Boulogne-Billancourt (FR)

(*) Notice: Subject to any disclaimer, the term of this patent is extended or adjusted under 35 U.S.C. 154(b) by 2393 days.

(21) Appl. No.: 11/863,483

(22) Filed: Sep. 28, 2007

(65) Prior Publication Data

US 2009/0088178 A1    Apr. 2, 2009

(51) Int. Cl.
| | | |
|---|---|---|
| H04B 15/00 | (2006.01) |
| H04W 72/08 | (2009.01) |
| H04L 12/801 | (2013.01) |
| H04W 4/02 | (2009.01) |
| H04W 28/18 | (2009.01) |
| H04W 48/16 | (2009.01) |
| H04W 72/06 | (2009.01) |
| H04W 88/08 | (2009.01) |

(52) U.S. Cl.
CPC ............ *H04W 72/085* (2013.01); *H04L 47/10* (2013.01); *H04W 4/02* (2013.01); *H04W 28/18* (2013.01); *H04W 48/16* (2013.01); *H04W 72/06* (2013.01); *H04W 88/08* (2013.01)

(58) Field of Classification Search
CPC . H04W 52/243; H04W 52/343; H04W 52/10; H04W 52/242; H04W 52/08; H04W 72/082; H04W 24/10; H04W 28/18; H04W 36/22; H04W 52/40; H04W 36/30; H04W 16/08; H04W 16/18; H04W 24/08; H04W 52/244; H04W 52/146; H04W 24/02; H04W 84/045; H04W 28/08; H04W 36/08; H04W 40/08; H04W 40/12

USPC ............ 455/453, 456.2, 561, 522, 506, 504, 455/67.11, 501, 63.1, 450, 438, 509; 370/335, 320, 341, 329, 252; 375/E1.036, 132, 260, 267
See application file for complete search history.

(56) References Cited

U.S. PATENT DOCUMENTS

| | | | |
|---|---|---|---|
| 6,219,343 B1 | 4/2001 | Honkasalo et al. | |
| 2004/0005041 A1* | 1/2004 | Zahir Azami | 379/112.06 |

(Continued)

FOREIGN PATENT DOCUMENTS

| | | |
|---|---|---|
| WO | 2006077141 A1 | 7/2006 |
| WO | WO 2006077141 A1 * | 7/2006 |

(Continued)

OTHER PUBLICATIONS

Universal Mobile Telecommunications System (UMTS); Enhanced uplink; Overall description; Stage 2 (3GPP TS 25.319 version 7.2.0 Release 7).

(Continued)

*Primary Examiner* — Fred Casca
(74) *Attorney, Agent, or Firm* — Carlson, Gaskey & Olds, P.C.

(57) ABSTRACT

A method of controlling a load at a wireless communication base station includes determining an indication of a maximum path loss between the base station and any high speed data users currently in a cell served by the base station. A target loading limit for the cell is set based upon the determined indication of the maximum path loss. In disclosed examples, the indication of the maximum path loss corresponds to a distance between a high speed user and a base station. Another factor considered in disclosed examples includes the data rate of such a high speed user.

17 Claims, 3 Drawing Sheets

(56) References Cited

U.S. PATENT DOCUMENTS

2004/0242257 A1* 12/2004 Valkealahti et al. .......... 455/522
2004/0268351 A1   12/2004 Mogensen et al.
2005/0208973 A1*  9/2005 Iochi ............................. 455/561
2008/0153509 A1*  6/2008 Piekarski ................... 455/456.2

FOREIGN PATENT DOCUMENTS

WO        2007039789 A1   4/2007
WO    WO 2007039789 A1 *  4/2007

OTHER PUBLICATIONS

QUALCOMM, Overload Indicator Command Triggering, 3GPP TSG-RAN WG2 Meeting #45bis, Sophia Antipolis, France, Jan. 10-14, 2005, pp. 1-4.
International Search Report and Written Opinion of the International Searching Authority for International application No. PCT/US2008/010817 mailed Feb. 11, 2009.
International Preliminary Report on Patentability for International application No. PCT/US2008/010817 mailed Apr. 8, 2010.

* cited by examiner

LOAD CONTROL FOR WIRELESS BASE STATION

FIELD OF THE INVENTION

This invention generally relates to communication. More particularly, this invention relates to wireless communication.

DESCRIPTION OF THE RELATED ART

Wireless communication systems are growing in popularity and versatility. Service providers are always striving to provide more and improved services to subscribers. One advance, for example, has been the introduction of high speed data communication capabilities. With the introduction of such capabilities, new control techniques become necessary to ensure a stable and reliable wireless communication system.

For example, ensuring data channel coverage requires limiting the total received signal power in the uplink at a base station. This total received signal power is called the received total wideband power (RTWP). One difficulty associated with limiting RTWP is that there is a tradeoff between limiting RTWP and allowing for cell throughput. For example, in legacy dedicated packet data arrangements, the RTWP is limited to be kept relatively small. At the same time, however, cell throughput is limited.

On the other hand, if RTWP is not limited, an overload of the base station serving the cell may occur. When this occurs, subscribers experience outage in the form of a loss of connection or reduced call quality.

It is necessary to control cell loading to a certain threshold with a high probability. In some systems it is desirable to keep the loading below a RTWP rise of 7 dB most of the time (e.g., 99% of the time). Such arrangements typically include a margin of 1 or 2 dB relative to the threshold value. With packet data transmissions, overshoot of the loading threshold depends on traffic distribution, user data rates, number of users, etc. Therefore, it is difficult to pick a single number for the margin.

One proposed technique includes a rise-over-thermal (RoT) control algorithm that is a closed-loop method based on RoT overshoot events. In that approach, if there is RoT overshoot above a threshold value, the RoT target is decreased by a predefined step size. Otherwise, the RoT target is increased gradually by a predefined step size.

Controlling RoT allows for controlling RTWP because RoT is the ratio of the total interference at a base station (e.g., RTWP) to thermal background noise.

One difficulty associated with the closed-loop RoT overshoot method is that it introduces fluctuation in RoT, which introduces transport control protocol (TCP) stall. Additionally, RoT overshoot may occur for various different reasons and it is difficult to isolate the cause and correct this. Examples include power control instability of a particular user, a rise in uncontrolled interference level, burstiness of traffic and fluctuations in the number of scheduled users. Additionally, RoT overshoot may occur because of estimation errors.

One other shortcoming of the RoT overshoot technique is that it tends to vary the target even for relatively short overshoot periods when such variation is not strictly necessary.

There is a need for an improved load control technique.

SUMMARY

An exemplary method of controlling a load at a wireless communication base station includes determining an indication of a maximum path loss between the base station and any high speed data users currently in a cell served by the base station. A target loading limit for the cell is set based upon the determined indication of the maximum path loss.

In one example, the indication of the maximum path loss is based upon a distance between any high speed users and the base station. One example includes using an expected data rate for such users when setting the target loading limit.

The various features and advantages of this invention will become apparent to those skilled in the art from the following detailed description. The drawings that accompany the detailed description can be briefly described as follows.

DETAILED DESCRIPTION

Disclosed examples provide load control for a wireless communication base station. The disclosed dynamic coverage control approach allows for adjusting a load control parameter dynamically. Overload control strategies are based on long-term statistics of RoT instead of relying on RoT overshoot events.

Figure 1:
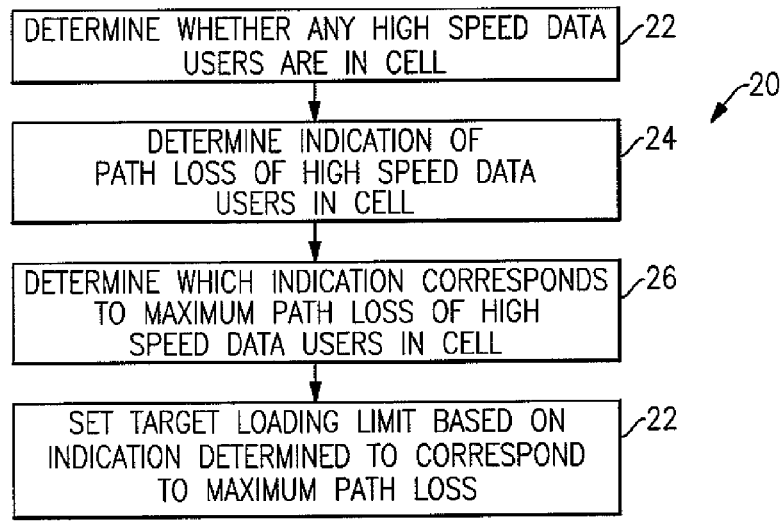
FIG. 1 is a flowchart diagram summarizing one example approach.

FIG. 1 includes a flowchart diagram 20 summarizing one example approach. At 22, a determination is made whether any high speed users are communicating within a cell. At 24, an indication of a path loss of each such user is determined. At 26, the indication corresponding to a maximum path loss is determined. At 28, a target loading limit for the cell is set based upon the indication corresponding to the maximum path loss.

The indication of a path loss considered for purposes of setting the target loading limit is associated with a high speed user. In one example, the high speed users communicate on an enhanced dedicated channel (E-DCH). In one example, the high speed data users communicate using high speed uplink packet access (HSUPA) capabilities. In such an example, the HSUPA scheduler controls the uplink load parameter to try to maximize cell throughput while still ensuring data channel coverage for the user with the worst propagation condition (e.g., the maximum path loss).

Figure 2:
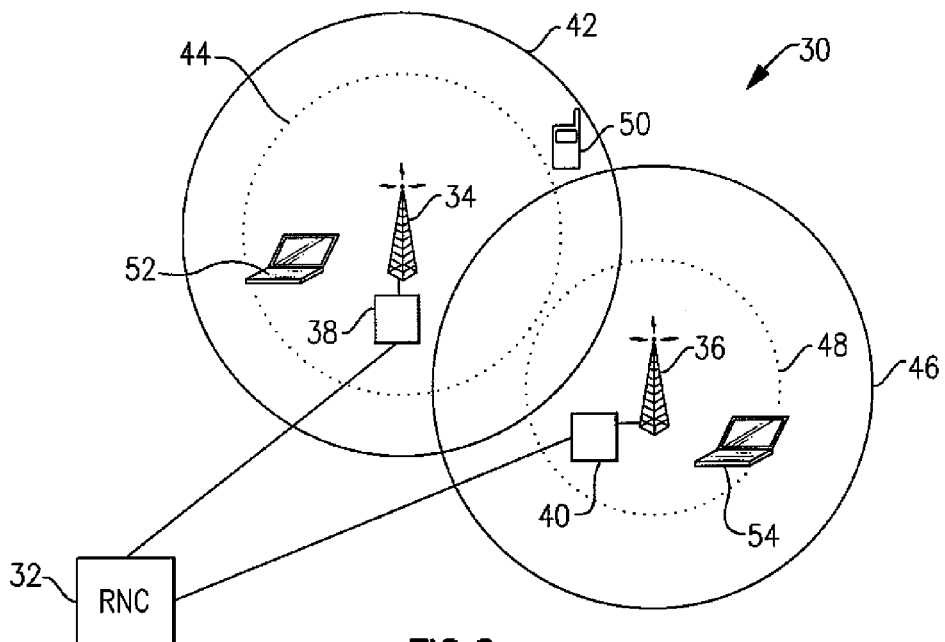
FIG. 2 schematically illustrates selected portions of a wireless communication system that is useful with an embodiment of this invention.

FIG. 2 schematically illustrates one example arrangement where selected portions of the wireless communication system 30 are illustrated. In this example, a radio network controller (RNC) 32 communicates with base stations 34 and 36, respectively, in a known manner. In this example, the base station 34 includes a scheduler 38 and the base station 36 includes a scheduler 40. The schedulers 38 and 40 in this example are HSUPA schedulers. The RNC 32 and the schedulers 38 and 40 are responsible for setting the appropriate loading limits for each cell served by each base station.

For example, the RNC 32 sets an overall loading limit that establishes a legacy channel coverage area of the cell served by the base station 34. This legacy channel coverage area is schematically shown at 42 in FIG. 2. The scheduler 38 in this example establishes an E-DCH coverage area schematically shown at 44. As can be appreciated from the illustration, the effective E-DCH coverage area at 44 is smaller than the coverage area schematically shown at 42.

Similarly, the RNC 32 in this example is responsible for establishing a legacy channel coverage area schematically shown at 46, which corresponds to the outer limit of the cell served by the base station 36. An E-DCH coverage area schematically shown at 48 is established by an appropriate load control parameter, which is controlled by the scheduler 40 in this example.

The scheduler 38 sets a target loading limit that effectively establishes the coverage area 44 based upon an indication of a maximum path loss between the base station 34 and any high speed data users currently in the cell served by the base station 38. In the example of FIG. 2, a mobile station 50 is used for voice communications, which are considered distinct from high speed communications for purposes of this description. Another mobile station 52 communicates on an E-DCH and is considered a high speed data user. The mobile stations 50 and 52 are within the cell coverage area 42 served by the base station 34. Scheduler 38 uses an indication of the maximum path loss associated with any high speed data users within the cell served by the base station 34 for purposes of setting the target loading limit to ensure high speed data coverage for such users.

In this example, the mobile station 52 is used by the user having the worst case propagation scenario such as a maximum path loss. The scheduler 38 uses an indication of the path loss between the mobile station 52 and the serving base station 34 as a basis for determining how to set the target loading limit. In one example, a distance between the mobile station 52 and the base station 34 is used as an indication of the maximum path loss for setting the target loading limit. The high speed data user having the furthest distance from the base station 34 is considered to have the maximum path loss in one example. Therefore, determining a distance between any high speed data users and the base station allows for determining an indication of the maximum path loss and to set the target loading limit for the cell accordingly. In many circumstances, the maximum distance between a mobile station and the base station provides a reliable indication of the maximum path loss.

In some examples, other parameters are useful as indications of the maximum path loss in addition to or in place of the maximum distance indication. One example includes determining when a mobile station is in a location that is known to have corresponding poor signal propagation conditions and using such a location determination as an indicator of the maximum path loss. For example, when a mobile station is at a particular elevation or near certain buildings or other landscape features signal propagation can be hindered. Identifying such locations and determining when a mobile station is at or near them may be used in one example for indication a maximum path loss. One example includes determining an actual or estimated value of the path loss to a plurality of mobile stations as the indication of the respective path losses and selecting the one corresponding to the worst case propagation condition for setting the target loading limit.

In the example of FIG. 2, another mobile station 54 is within the cell served by the base station 36. The mobile station 54 in this example represents the maximum path loss between the base station 36 and any high speed data users within the corresponding cell. The scheduler 40 establishes the target loading limit based upon an indication of the maximum path loss such as the distance between the base station 36 and the mobile station 54 in this example.

As can be appreciated from the illustration, the E-DCH coverage area 44 is larger than the E-DCH coverage area 48. This is due, at least in part, to the larger distance between the mobile station 52 and the base station 34 compared to the distance between the mobile station 54 and the base station 36. In other words, the E-DCH coverage area is controlled based upon the distance between a high speed data user and the serving base station that is considered an indicator of the maximum path loss or worst case propagation scenario. By setting a target loading limit, such as an RTWP limit, based upon the high speed data user having the maximum path loss, it is possible to ensure adequate coverage for that user and any other high speed data users with a more favorable path loss or propagation condition. At the same time, cell throughput can be maximized by increasing an RTWP threshold under more favorable propagation conditions or reducing the RTWP threshold as needed based upon less favorable propagation conditions.

Determining how to set an RTWP limit or a target loading limit for a cell in one example is accomplished to ensure certain target data rates for the mobile stations that experience maximum propagation loss. One example includes considering an aggregate loading for such a user k. The aggregate loading for a user k can be described by the following equation:

$$L_k = \left(\frac{E_c}{N_0}\right)_{DPCCH,k} \left(1 + TPR_{E\text{-}DPDCH} + TPR_{E\text{-}DPCCH} + TPR_{DPDCH} + TPR_{HS\text{-}DPCCH}\right) \quad \text{(Eq. 1)}$$

In which $E_c/N_o$ is the energy-per-chip-to-noise-power-density ratio taken from the dedicated physical control channel (DPCCH) for user k, $TPR_{E\text{-}DPDCH}$ is the traffic to pilot power ratio of the enhanced dedicated physical data channel (E-DPDCH), $TPR_{E\text{-}DPCCH}$ is the traffic to pilot power ratio of the enhanced dedicated physical control channel (E-DPCCH), $TPR_{DPDCH}$ is the traffic to pilot power ratio of the dedicated physical data channel (DPDCH) and $TPR_{HS\text{-}DPCCH}$ is the traffic to pilot power ratio of the high speed dedicated physical control channel (HS-DPCCH).

The maximum loading that the user can support for maximum mobile station transmit power $(P_{TxMax})_k$ is described by the following relationship:

$$L_k \leq \frac{(P_{Tx,Max})_k}{RTWP_j} \quad \text{(Eq. 2)}$$

The received total wideband power (RTWP) limit for a cell j, in which the user k is the user having the maximum path loss between the base station and the user's mobile station in one example, is achieved by combining equations 1 and 2 as follows:

$$RTWP_j \leq \frac{(P_{Tx,Max})_k}{(E_c/N_0)_{DPCCH,k} \cdot \left(1 + TPR_{E\text{-}DPDCH} + TPR_{E\text{-}DPCCH} + TPR_{DPDCH} + TPR_{HS\text{-}DPCCH}\right)} \quad \text{(Eq. 3)}$$

$$= \frac{(P_{Tx,Max})_k}{(E_b/N_0(TB_k))_{E\text{-}DPDCH,k}/TPR_{E\text{-}DPDCH} \cdot (1 + TPR_{E\text{-}DPDCH} + TPR_{E\text{-}DPCCH} + TPR_{DPDCH} + TPR_{HS\text{-}DPCCH})}$$

where $(E_b/N_0(TB_k))_{E\text{-}DPDCH,k}$ denotes the required energy-per-bit on E-DPDCH for a given transport block size.

Figure 3:
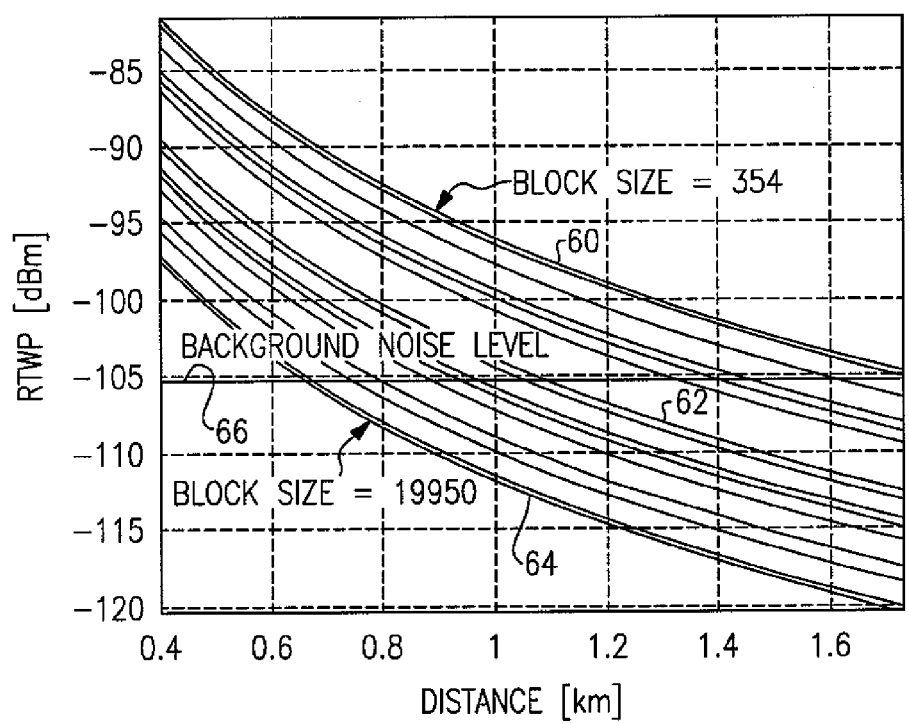
FIG. 3 graphically illustrates example target loading limits.

FIG. 3 graphically illustrates example RTWP limits based upon the relationship of Equation 3. A plurality of target loading limits 60, 62 and 64 are illustrated as examples. As can be appreciated from FIG. 3, as a distance between the mobile station and base station increases, the RTWP limit or target loading limit decreases (e.g., from left to right according to the drawing).

One example includes considering the indicator of the maximum path loss (e.g., the distance between the mobile station and base station) and the transport block size associated with the expected data rate for the user when determining how to set the target.

Another feature of the example of FIG. 3 is that as the data rate for the user changes, the target loading limit changes. The target loading limit shown at 60 corresponds to a first data rate associated with a first transport block size. The target loading limit shown at 62 corresponds to another data rate with an associated larger transport block size. The target loading limit 64 corresponds to a still higher data rate with a higher transport block size. As can be appreciated from FIG. 3, as the transport block size increases, the target loading limit decreases.

For example, the target loading limit 60 might correspond to a transport block size of 354 bits with a physical channel bit rate of 120 Kbps. To ensure 120 Kbps data rate for each user in the cell, the target loading limit should not exceed the threshold shown at 60 and should not be below the background noise level shown at 66. For a user having a block size of 19950 bits and an associated physical channel bit rate, the RTWP limit is kept above the background noise level shown at 66 and below the target loading limit 64.

The example approach allows for dynamically controlling an RTWP limit or target loading limit for a cell based upon the current worst case propagation scenario for any high speed data users within the cell. The HSUPA scheduler of a corresponding base station can, therefore, dynamically adjust the target loading limit to accommodate current high speed data user conditions.

In one example, the RNC 32 controls an upper limit on the target loading limit set by the schedulers 38 and 40. This limit established by the RNC 32 ensures legacy channel coverage such as the physical random access channel (PRACH), DPDCH and HS-DPCCH.

Figure 4:
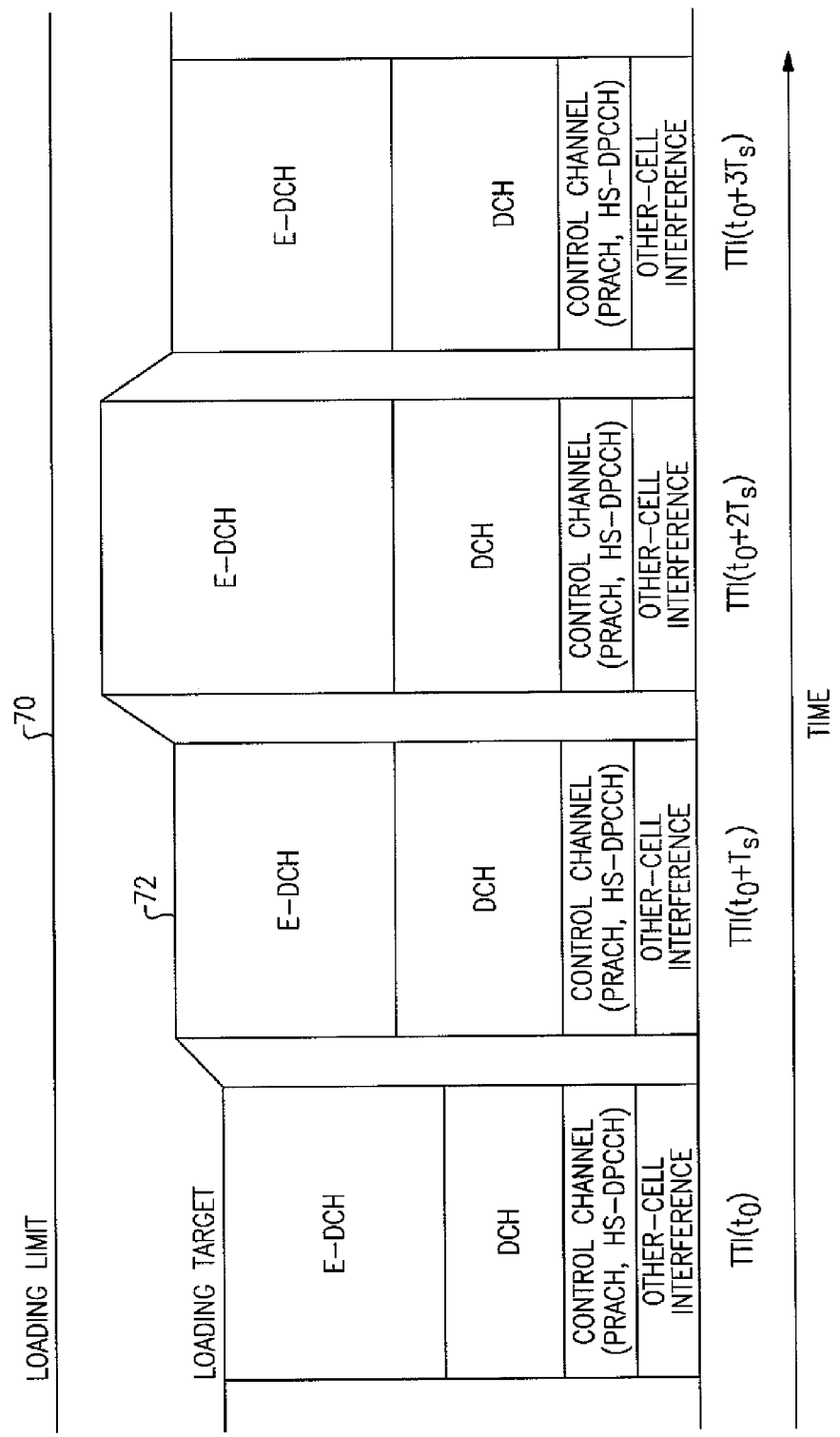
FIG. 4 schematically illustrates an example approach for controlling a load at a wireless communication base station.

FIG. 4 illustrates one example approach where a maximum loading limit 70 is set by the RNC 32. The target loading limit shown at 72 varies for different transmission time intervals (TTI) over time. The target loading limit 72, which is set by the HSUPA scheduler in this example, is kept at or below the maximum loading limit 70, which is set by the RNC 32 in this example. The long-term maximum loading limit 70 is set in most examples to guard against overshoot when setting the target loading limit 72.

One example includes an overload control approach for setting an overload safety margin depending on long-term statistics of loading. In particular, estimating the variance of loading allows for setting a margin to satisfy a desired overshoot probability.

Total cell loading can be described by the following relationship, cf. (Eq. 1):

$$L = \sum_{k:DCH}\left(\frac{E_c}{I_0}\right)_k (1 + TPR_{DPDCH,k}) + \sum_{k:E\text{-}DCH}\left(\frac{E_c}{I_0}\right)_k \\ \left(TPR_{E\text{-}DPCCH,k} + TPR_{E\text{-}DPDCH,k}\right) + \\ L_{PRACH} + L_{HS\text{-}DPCCH} + L_{oc}$$ (Eq. 4)

where Ec/Io is the ratio of the energy-per-chip of a pilot signal to the total received energy, the TPR terms are as described above and the L terms represent the loads of the indicated channels. For a large number of random variables, the overshoot probability can be approximated as a Gaussian random variable. For a Gaussian random variable the outage probability is $$P_{outage} = Pr[L \geq \eta] \cong Q\left(\frac{\eta - E[L]}{\sqrt{Var(L)}}\right)$$ (Eq. 5)

where $\eta$ is the loading threshold and $Pr[L \leq \eta]$ is the probability that the load will meet or exceed the loading threshold. System operates at loading not exceeding the loading threshold $\eta$ with probability $P_0$. The mean (E) and the variance (Var) of the loading satisfies the relation $$E[L] \leq \eta - Q^{-1}(P_0) \cdot \sqrt{Var(L)}$$ (Eq. 6)

where The Q function is a mathematical function used to describe a Gaussian tail.

In one example, the mean (E) and the variance (Var) of the loading are obtained using long-term average loading statistics providing that the traffic distribution does not change. When the variance (Var(L)) of the loading is zero, the mean loading is equal to the loading threshold. Under these circumstances, a cell can operate at the maximum loading threshold level without margin. Depending on the variance of loading, the target loading can be reduced proportional to the variance of the loading.

One approach includes estimating the mean and variance of loading over time. The following relationships are used in one example:

$$E[L] = \frac{1}{N}\sum_{n=1}^{N} L_n$$

$$Var(L) = \frac{1}{N-1}\sum_{n=1}^{N}(L_n - E[L])^2$$

Then the target loading is determined as $L_{Target} = \eta - Q^{-1}(P_0) \cdot \sqrt{Var(L)}$ where $L_{Target}$ is the target loading limit, $\eta$ is the maximum loading threshold, $P_o$ is a probability that the system operates at a loading without exceeding the maximum loading threshold. Once the target loading limit is estimated, users may be scheduled with corresponding rates based on a selected scheduling metric.

In many situations, the distribution of loading cannot be approximated as a Gaussian random variable and actually has an asymmetric behavior including long tail distribution. Accordingly, one example includes estimating the variance for loadings that exceed the mean loading and not including the inverse of Q function when determining the loading target. One example implementation of this approach includes the following relationships:

$$E[L] = \frac{1}{N}\sum_{n=1}^{N} L_n$$

$$\mathrm{Var}(L) = \frac{1}{N-1}\sum_{n=1}^{N}(L_n - E[L])^2 \text{ if } L_n > E[L]$$

In this example, the target loading limit is determined as $L_{Target} = \eta - F(P_0) \cdot \sqrt{\mathrm{Var}(L)}$ where $F(\cdot)$ is a constant that depends on the outage probability $P_o$, the traffic mix, the number of scheduled users and data rates. The parameter $F(\cdot)$ is optimized off-line in one example.

In many situations, input variables are noisy and the target load can experience significant fluctuations. One example approach addresses these factors by using the following relationships for estimating the mean and variance of the loading:

$$E[L] = \frac{1}{N}\sum_{n=1}^{N} L_n;$$

$$\mathrm{Var}(L) = \frac{1}{N-1}\sum_{n=1}^{N}(L_n - E[L])^2 \text{ if } L_n > E[L]$$

A hypothetical or test target loading $L_{target,HYP}(n)$ is determined using $L_{Target} = \eta - F(P_0) \cdot \sqrt{\mathrm{Var}(L)}$. The hypothetical or test loading limit is then compared with a previously determined test loading limit. If the more recent test loading limit is greater than or equal to the previous one, the target loading limit is incremented by a selected amount. If the most recent test loading limit is less than the previously determined one, then the target loading limit is decreased by a preselected decrement. The amounts for incrementing or decrementing the target loading limit in one example comprise tuneable parameters that are determined in a preselected manner. One example includes setting an initial target loading limit approximately equal to the maximum loading limit assigned by the RNC 32.

As can be appreciated from the above description, a dynamic method of controlling a load at a wireless communication base station is based upon an indication of high speed user path loss and allows for an RTWP or target loading limit for a cell to be determined depending on an E-DCH user within the cell having the least favorable propagation condition. In the above examples, an RTWP limit can be determined based upon the data rate requirements of such an E-DCH user and the location of such a user. Considering an indication of the path loss of the user having the maximum path loss allows for setting the RTWP limit in a manner that ensures high speed data coverage for all users in the cell at that particular time.

With the disclosed examples, E-DCH coverage can be temporarily reduced to allow the system to operate at a higher RTWP value to improve cell throughput, in order to provide E-DCH coverage only to the users that have high speed data to transmit. Dynamically adapting the target loading limit in one example is accomplished slowly and the adaptation can change due to mobility. Additionally, it is possible to address E-DCH traffic changes such as transport block size changes. Accordingly, not only movement or position of a high speed data user will have an influence on the target loading limit, but data rates changing for a particular user can be used to dynamically adjust the target loading limit. Additionally, legacy channel coverage is ensured by setting a maximum loading limit.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An apparatus, comprising
a wireless communication base station, comprising
a scheduler that is configured to set a target loading limit for the cell based upon an indication of a maximum path loss between the base station and any high speed data users currently in a cell served by the base station, the scheduler is configured to determine a maximum loading limit for the cell and to set the target loading limit to be less than or equal to the maximum loading limit, the scheduler being configured to set the target loading limit based upon a mean loading in the cell over a selected time and a variance of the loading in the cell over the selected time;
wherein the scheduler is configured to set the target loading limit based upon a transport block size for the user corresponding to the indication of the maximum path loss.

2. The apparatus of claim 1, wherein the scheduler is configured to
select a first target loading limit when the transport block size has a first value; and
select a second, lower target loading limit when the transport block size has a second, larger value.

3. A method of controlling a load at a wireless communication base station, comprising the steps of:
determining an indication of a maximum path loss between the base station and any high speed data users currently in a cell served by the base station;
determining a maximum loading limit for the cell;
determining a transport block size for the user corresponding to the determined indication of the maximum path loss; and
setting a target loading limit for the cell,
wherein setting the target loading limit is based upon the determined indication of the maximum path loss,
based upon a mean loading in the cell over a selected time and a variance of the loading in the cell over the selected time, and
based upon the determined transport block size,
and wherein the target loading limit is set to be less than or equal to the maximum loading limit.

4. The method of claim 3, comprising
selecting a first target loading limit when the determined transport block size has a first value; and
selecting a second, lower target loading limit when the determined transport block size has a second, larger value.

5. The method of claim 3, comprising
selecting a first target loading limit when the determined indication of the maximum path loss has a first value; and
selecting a second, larger loading limit when the determined indication of the maximum path loss has a second, lower value.

6. The method of claim 3, comprising
determining distances between any high speed data users currently in the cell and the base station and wherein the determined indication of the maximum path loss corresponds to the furthest determined distance.

7. The method of claim 6, comprising setting the target loading limit for the cell based upon the furthest distance.

8. The method of claim 3, wherein the high speed users communicate on an enhanced dedicated channel (E-DCH).

9. The method of claim 3, comprising updating the target loading limit more frequently than making any changes to the maximum loading limit.

10. The method of claim 3, comprising
determining the maximum loading limit using a radio network controller associated with the base station based upon a desired cell coverage for the cell; and
determining the target loading limit using a scheduler of the base station.

11. A method of controlling a load at a wireless communication base station, comprising the steps of:
determining an indication of a maximum path loss between the base station and any high speed data users currently in a cell served by the base station;
determining a maximum loading limit for the cell;
setting a target loading limit for the cell,
    wherein setting the target loading limit is based upon the determined indication of the maximum path loss, and
    based upon a mean loading in the cell over a selected time and a variance of the loading in the cell over the selected time,
    and wherein the target loading limit is set to be less than or equal to the maximum loading limit; and
updating the target loading limit more frequently than making any changes to the maximum loading limit.

12. The method of claim 11, comprising
determining the maximum loading limit using a radio network controller associated with the base station based upon a desired cell coverage for the cell; and
determining the target loading limit using a scheduler of the base station.

13. The method of claim 11, comprising
determining a transport block size for the user corresponding to the determined indication of the maximum path loss; and
wherein setting the target loading limit is based upon the determined transport block size.

14. The method of claim 13, comprising
selecting a first target loading limit when the determined transport block size has a first value; and
selecting a second, lower target loading limit when the determined transport block size has a second, larger value.

15. A method of controlling a load at a wireless communication base station, comprising the steps of:
determining an indication of a maximum path loss between the base station and any high speed data users currently in a cell served by the base station;
determining a maximum loading limit for the cell;
setting a target loading limit for the cell
    wherein setting the target loading limit is based upon the determined indication of the maximum path loss,
    based upon a mean loading in the cell over a selected time and a variance of the loading in the cell over the selected time,
    based upon a first desired difference between the maximum loading limit and the target loading limit when the variance has a first value, and
    based upon a second, larger desired difference between the maximum loading limit and the target loading limit when the variance has a second, larger value,
    and wherein the target loading limit is set to be less than or equal to the maximum loading limit.

16. A method of controlling a load at a wireless communication base station, comprising the steps of:
determining an indication of a maximum path loss between the base station and any high speed data users currently in a cell served by the base station;
determining a maximum loading limit for the cell;
setting a target loading limit for the cell based upon the determined indication of the maximum path loss, wherein the target loading limit is set to be less than or equal to the maximum loading limit;
determining a test target loading limit based on the maximum loading limit and a variance of the target loading limit over a selected time;
determining whether the determined test target loading limit is greater than a previous test target loading limit;
setting the target loading limit equal to a current target loading limit plus a selected increment if the determined test target loading limit is greater than the previous test target loading limit; and
setting the target loading limit equal to a current target loading limit minus a selected decrement if the determined test target loading limit is less the previous test target loading limit.

17. The method of claim 16, comprising setting an initial value of the target loading limit approximately equal to the maximum loading limit.

* * * * *